Sept. 29, 1931.  H. J. STIEGER  1,825,371
WING AND AILERON CONSTRUCTION FOR AIRCRAFT
Filed June 26, 1930
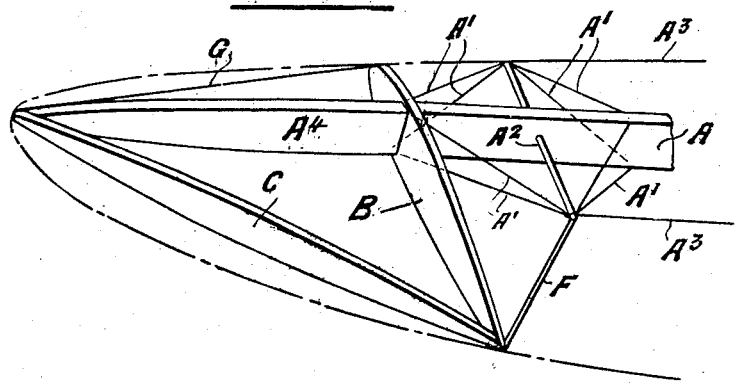
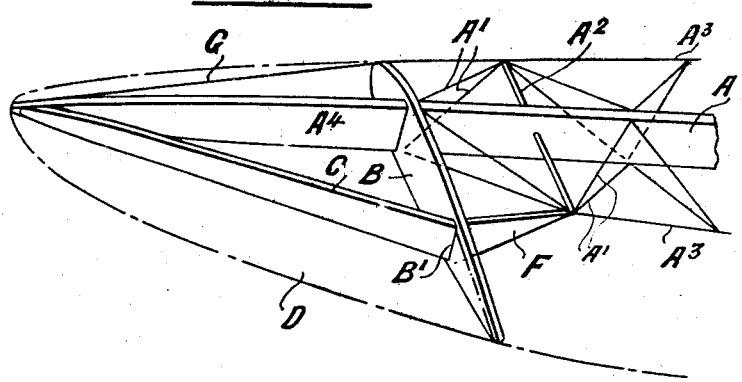
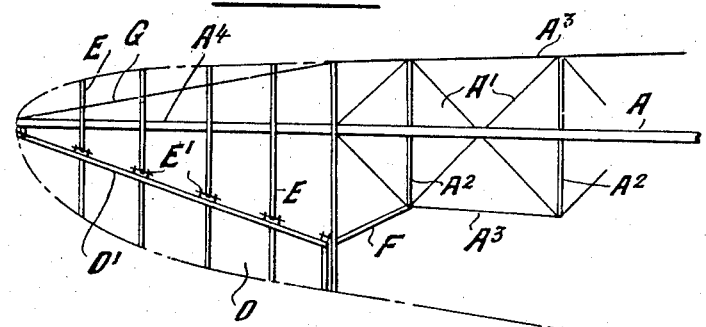

Patented Sept. 29, 1931

1,825,371

UNITED STATES PATENT OFFICE

HELMUT JOHN STIEGER, OF WIMBLEDON, LONDON, ENGLAND, ASSIGNOR TO THE MONO-SPAR COMPANY, LIMITED, OF LONDON, ENGLAND

WING AND AILERON CONSTRUCTION FOR AIRCRAFT

Application filed June 26, 1930, Serial No. 463,959, and in Great Britain June 27, 1929.

In wings for aircraft which are constructed with a single spar of the cantilever type braced against torsional stresses, it is difficult to stay the wing tip against similar torsional stresses in an efficient manner unless a cantilever spar of considerable depth is maintained throughout the whole length of the wing. It is however desirable to reduce the thickness of the wing tips both for aerodynamic and structural considerations.

The purpose of the present invention is to provide for the bracing of the cantilever spar, when this is continued in diminishing depth at the wing tip, and thus stay the end of the cantilever spar against torsional stresses while allowing of a reduction in the thickness of the wing tips.

According to this invention, the cantilever spar continues from the root of the wing out to a point where staying of the spar against torsional stresses ceases to be convenient and this portion of the spar is itself braced against torsional stresses. Beyond this point where the wing is reduced in thickness, the cantilever spar is continued in diminishing depth and this continued portion of the cantilever spar requires some other system of staying against torsion. At the said point a stiff rib is introduced which may conveniently form a longitudinal bulkhead in the wing, through which rib the cantilever spar passes and extends out to the wing tip. In a position aft of the cantilever spar a diagonal spar is introduced, which at its outer end is attached to the end of the cantilever spar in such a manner that its base rests against the stiff rib which is supported on the other side by a compression member bearing against the apex of one of the pyramid bracings constituting the means for staying the main portion of the spar against torsional stresses. A triangulated structure is thus formed with the diagonal spar, the outer extension of the cantilever spar and the stiff cross rib. To the diagonal spar the aileron may be hinged.

In some constructions the aileron may be hinged behind the diagonal spar by extending the ribs behind the spar and hinging the aileron on the ends of the ribs, which thus extend in an aft direction.

In a modification, instead of the diagonal spar forming a portion of the wing tip structure, this diagonal spar may form the leading edge of the aileron and be hinged to the after ends of the ribs which terminate on the hinged line of the aileron.

Fig. 1 of the accompanying drawings illustrates diagrammatically a wing tip in which a single cantilever spar is provided, the main portion A of which continues in constant depth from the root of the wing to a point where the wing is reduced in thickness, at which point a stiff cross rib B is fixed to the cantilever spar. The portion A of the cantilever spar is itself conveniently braced against torsion by means of the triangular bracings $A^1$ and struts $A^2$, the apices of the triangular bracings being stayed in line on each side of the spar by longitudinal bracings $A^3$. The cantilever spar is extended beyond the stiff cross rib B, and this extended portion $A^4$ diminishes in depth on its outer end. The diagonal spar C extends between the outer end of the cantilever spar portion $A^4$ and the after end of the cross rib B and is attached at its ends to these parts. The after end of the rib B is supported against drag stresses by a compression member F, and a drag wire G may be provided to supplement the support given by the member F.

Fig. 2 shows a similar arrangement in which the after end of the diagonal spar C is located at a point $B^1$ between the spar $A^4$ and the end of the stiff cross rib B so as to leave a space at the after edge of the wing tip for the aileron D. In this case the compression member F is located on the opposite side of the rib B at a point coinciding with the end of the spar C.

Fig. 3 is a plan view of a wing tip, in which the ribs E at the tip of the wing structure terminate rearwardly on the hinged line of the aileron and the rear edges are provided with hinges $E^1$ to which is hingedly connected a diagonal spar $D^1$ forming the leading edge of the aileron D.

By means of this invention torsion bracing of single spars, viz. spars of the type in which a boom above and a boom below are connected by a web, may be used in cantilever spars out to the distance where it is desired to reduce the height of the web for the purpose of reducing the thickness of the wing, and beyond which the torsion bracing is less effective. In such structures, the torsional stiffness of the outer portions of the wings where the ailerons are carried is secured without necessitating unnecessary depth of wing.

What I claim as my invention and desire to secure by Letters Patent is:—

1. Cantilever wings for aircraft comprising, in combination, a single spar having a tapered extension, means on said spar up to the tapered extension for bracing said spar against torsional deflection, a stiff cross rib at the inner end of said tapered extension of the spar and a diagonal spar connecting the outer tip of said tapered extension to the after portion of the stiff cross rib.

2. In wings for aircraft, a cantilever spar arrangement as claimed in claim 1, in which the aileron is hinged to the diagonal spar.

3. In wings for aircraft, a cantilever spar arrangement as claimed in claim 1, in which instead of the diagonal spar forming a portion of the wing structure, the diagonal spar forms the leading edge of the aileron.

4. Cantilever wings for aircraft comprising, in combination, a single spar having a tapered extension, means for bracing said spar up to the tapered extension against torsional deflection, a stiff cross rib at the inner end of said tapered extension of the spar, wing tip ribs on said tapered extension, an aileron, a diagonal spar on said aileron and means hingedly connecting the after end of said wing tip ribs and stiff cross rib to said diagonal spar.

5. Cantilever wings for aircraft comprising a single spar having a main portion and a tapered extension, triangular bracings and struts for bracing said main portion of the spar against torsional deflection, a stiff cross rib at the inner end of said tapered extension of the spar, and a diagonal spar connecting the outer tip of said tapered extension to the after portion of the stiff cross rib.

6. Cantilever wings for aircraft comprising a single spar having a main portion and a tapered extension, triangular bracings and struts for bracing said main portion of the spar against torsional deflection, a stiff cross rib at the inner end of said tapered extension of the spar, wing tip ribs on said tapered extension, an aileron, a diagonal spar on said aileron and means hingedly connecting the after ends of said wing tip ribs and stiff cross rib to said diagonal spar.

In witness whereof I have hereunto set my hand.

HELMUT JOHN STIEGER.